United States Patent Office 2,990,290
Patented June 27, 1961

2,990,290
ADHESIVE CEMENT FOR PLASTICS
Curt B. Roth, Binghamton, N.Y., assignor to General Aniline & Film Corporation, New York, N.Y., a corporation of Delaware
No Drawing. Filed Mar. 27, 1958, Ser. No. 724,224
13 Claims. (Cl. 106—186)

This invention relates to adhesive cement for uniting plastic materials. More specifically this invention relates to a cement for splicing photographic film especially motion picture film.

The cements heretofore used for cementing plastic materials and especially those cements designed for splicing photographic film are not entirely satisfactory. The splice is usually not as strong as desired and the cement is very slow drying which is a disadvantage when used commercially.

The prior art cements used for splicing film usually comprise a cellulose ester such as cellulose nitrate dissolved in a mixture of low boiling solvents such as methylene chloride and acetone. Methylene chloride is not miscible with water and the cooling of the spice and adjacent area, which results from the evaporation of this solvent, causes a condensation of water which in turn causes a blistering of the splice, thereby weakening the same. Acetone, while water miscible, evaporates very rapidly and at a very low temperature and is instrumental in removing only a small fraction of the condensed water.

It is, accordingly, an object of this invention to provide an adhesive cement for uniting organic plastic materials which is capable of producing a very strong bond.

It is a further object of this invention to provide an adhesive cement for splicing photographic film which is fast drying and forms a strong, substantially permanent bond.

It is a still further object of this invention to provide an adhesive cement containing low boiling solvents and a high boiling solvent.

Other objects and advantages of this invention will appear from the detailed description thereof given below.

I have found that the addition of a small amount of a water-miscible, high-boiling solvent to the mixture of solvents heretofore used in the art to prepare adhesive cements imparts unexpectedly superior bonding properties to the cement. The objects of my invention may, therefore, be accomplished by adding a small amount of a high boiling solvent to the cement of the prior art.

While I do not intend to be limited to any theory of operation, I believe that the unexpectedly superior bonding properties of the cement of my invention over that of the prior art cements are due to the fact that the water-miscible, high-boiling solvent added to the cement causes the removal of the last traces of any condensed water formed at the splice by the evaporation of the low boiling solvent or solvents. I have found that the formamides which are solvents for cellulose esters, and especially the dialkyl formamides such as dimethylformamide and diethylformamide, form excellent high-boiling solvents for use according to my invention. The dialkylformamides are water-miscible. Dimethylformamide has a boiling point of approximately 154° C., and is also a solvent for the commonly used plasticizers for cellulose esters, such as tricresyl phosphate and dibutyl phthalate for example.

Various formulations of plastic cements containing solvents, such as acetone and methylene chloride, for example, and cellulose esters, such as cellulose nitrate and cellulose acetate, for example, may be used according to my invention. The cellulose ester in the cement acts primarily as a viscosity controlling agent. The greater the quantity of the ester the greater the viscosity of the cement. The quantity of ester included in the cement also has an effect on the drying time of the cement. For the same solvent composition, the greater the quantity of ester present in the cement, the slower it drys. The type of ester used also has a certain effect on the strength of the bond. When cellulose acetate is used as the cellulose ester in the cement, it produces a much stronger bond or splice between motion picture films having a base of cellulose triacetate such as "Anscochrome," "Super Anscochrome," "Kodachrome" and "leaders" than the bond obtainable with cellulose nitrate. These leaders are white opaque film materials always used at the beginning and sometimes at the end of a processed movie film. This material is attached to the actual picture portion of the motion picture film and is used to thread the beginning of the film roll through the projector. This leader is made from cellulose esters or mixed esters related to the materials used in the manufacture of the film base of the motion picture film. The leader is rendered white-opaque by the inclusion or surface application of a pigment, e.g., zinc oxide, titanium dioxide, barium sulfate and the like. The use of these whitening agents makes it possible to write on the leader with ink, pencil or ball-point pens.

The rough, gritty surface of the leader frequently causes trouble in splicing. With the film cements available up to now, it was not only difficult to splice picture films, made by one manufacturer, to the leader, or for that matter to the motion picture film made by another manufacturer but the splices were not of a permanent nature. After one or more projections, these splices "peeled," which describes a separation without breaking.

My improved cement composition using cellulose acetate as the cellulose ester, methylene chloride, alone or mixed with acetone as the low boiling solvents, and dimethylformamide as the high-boiling solvent, has been found to produce a very strong splice between the two films. The following table gives a number of examples of different cement compositions which may be used according to my invention.

TABLE I
*Composition of cement*

| Example No. | Acetone, ml. | Nitrocellulose, g. | Ethanol, ml. | Dimethyl formamide, ml. | Methylene chloride, ml. |
|---|---|---|---|---|---|
| 1 | 40 | 5.0 | 10 | 4 | 70 |
| 2 | 40 | 3.0 | 10 | 5 | 70 |
| 3 | 60 | 3.0 | 10 | 5 | 60 |
| 4 | 60 | 2.5 | 10 | 5 | 60 |
| 5 | 60 | 2.0 | 10 | 5 | 60 |
| 6 | 60 | 1.7 | 10 | 5 | 60 |
| 7 | 60 | 1.4 | 10 | 5 | 60 |
| 8 | 60 | 1.1 | 10 | 5 | 60 |
| 9 | 60 | 0.8 | 10 | 5 | 60 |
| 10 | 60 | 0.5 | 10 | 5 | 60 |
| 11 | 60 | 0.2 | 10 | 5 | 60 |
| 12 | 60 | 0.2 | 10 | 4 | 60 |
| 13 | 60 | 0.2 | 10 | 8 | 60 |

The amount of dimethylformamide included in the cement may be varied over a wide range. Depending upon the type of film to be spliced, dimethylformamide may be added to the cement in amounts ranging from 0.3 to 6.0 milliliters per U.S. liquid ounce 29.6 milliliters). The best results, however, are obtained when the amount of dimethylformamide in the composition of the examples given above is between 4 and 8 milliliters, or approximately 3 to 6 milliliters per 100 milliliters of cement. Optimum results are obtained when five milliliters of dimethylformamide or approximately 3.7 grams per 100 milliliters are employed. The amount of cellulose nitrate may also be varied; the preferred amount, however, being from 0.15 gram to 4 grams per 100 milliliters of cement.

The cellulose nitrate used in the above examples can be one of the several cellulose nitrates sold under the name "Cellulose Nitrate Type RS." The Cellulose Nitrates Type RS have a nitrogen content of from 11.8 to 12.2 percent. The types best suited for use in my cements are chosen from those having a viscosity which places them within the 5 to 20 second types as described on pages 8 and 11 in the Hercules "Nitrocellulose Handbook, Form 500–80 10M 9–48," published by the Cellulose Products Department, Hercules Powder Company, Wilmington 99, Delaware, in 1948.

Before use, these materials are freed from ethanol and moisture by drying in a desiccator. Other types of cellulose nitrate, however, may also be used.

Of the thirteen examples of cement compositions given in Table I, two are of special utility in splicing motion picture film. The cement of Example 5 is especially suitable for amateur work. This cement has approximately the same viscosity and the same drying time as the prior art cements used for this purpose. However, the splice obtained by the use of the cement of Example 5 is far superior in strength to that which can be obtained by the prior art cements.

The cement of Example 11 is a very fast drying cement and produces a very strong bond. In view of the unusual rapidity with which the cement of Example 11 dries, it is especially suitable for commercial use by professional splicers. Most prior art cements require a dwell of about 15 seconds in the splicing device in order to permit a sufficient setting of the cement to remove the splice from the device. No such dwell is necessary with the novel cement of Example 11, and the splicing device may be opened immediately after closing and the splice removed therefrom. The splice produced by our novel cement is so strong that the film itself will tear apart, upon twisting of the film sideways, before any peeling of the splice takes place.

The cement compositions of Examples 1 to 13 in Table I all contain cellulose nitrate as the viscosity controlling agent. As already stated, the particular cellulose ester used in the cement composition, to some extent at least, also effects the strength of the splice. I have found that if the cellulose nitrate, as shown in Table I, is replaced by cellulose acetate, a stronger bond is obtained between certain types of film than is obtained by the use of cellulose nitrate. Thus, while the composition of the cement of Example 11 forms an excellent splice as between films having as a base, cellulose triacetate, such as for example "Anscochrome" and "Super Anscochrome," this particular cement forms a rather weak bond between "Anscochrome" or "Super Anscochrome" and "Eastman Kodak Leader" films. I have found that if the cellulose nitrate of Example 11 is replaced with cellulose acetate, an excellent splice is formed between any two of the films mentioned above. In making the substitution, it was found to be advantageous to add a small amount of cyclohexane to the cement. The presence of cyclohexane in the cement compositions containing cellulose acetate greatly improves the bonding properties of the cement, whereas no improvement in the bonding properties of the cement containing cellulose nitrate has been observed by the presence therein of cyclohexane. An example of a cement composition containing cellulose acetate which gives an excellent splice is given below.

EXAMPLE 14

| | | |
|---|---|---|
| Methylene chloride | ml | 60 |
| Cellulose acetate | g | 0.2 |
| Ethanol | ml | 10 |
| Acetone | ml | 60 |
| Dimethylformamide | ml | 5 |
| Cyclohexane | ml | 6 |

In Table II below are given other examples of splicing cement compositions containing cellulose acetate which give good results. While, as previously stated, cyclohexane improves the bonding properties of a cement containing cellulose acetate, it is not absolutely necessary and good results are obtained in many instances without the use of this compound.

TABLE II

| Example No. | Methylene Chloride, ml. | Cellulose acetate, g. | Ethanol, ml. | Acetone, ml. | Dimethyl formamide, ml. | Cyclohexane, ml. |
|---|---|---|---|---|---|---|
| 15 | 60 | 2.5 | 10 | 60 | 5 | |
| 16 | 60 | 2.0 | 10 | 60 | 5 | 2 |
| 17 | 60 | 1.7 | 10 | 60 | 5 | |
| 18 | 60 | 1.4 | 10 | 60 | 5 | 2 |
| 19 | 60 | 1.1 | 10 | 60 | 5 | |
| 20 | 60 | 0.8 | 10 | 60 | 5 | 2 |
| 21 | 60 | 0.5 | 10 | 60 | 5 | |
| 22 | 60 | 0.2 | 10 | 60 | 5 | 2 |
| 23 | 60 | 0.5 | 10 | 60 | 5 | 10 |
| 24 | 60 | 0.5 | 10 | 60 | 5 | 2 |
| 25 | 15 | 0.5 | | | 10 | 0.3 |
| 26 | 15 | 0.5 | | | 10 | 1.4 |
| 27 | 60 | 2.0 | 10 | 60 | 5 | 2 |
| 28 | 60 | 2.0 | 10 | 10 | 5 | 2 |
| 29 | 60 | 2.0 | 10 | | 5 | 2 |
| 30 | 60 | 0.8 | 10 | | 5 | 2 |

The cellulose acetate used in Examples 14 to 30 is type "TH–4," and has the following specifications: combined acetic acid 60.1 to 60.8 percent (62.5 percent defines a completely acetylated cellulose); viscosity range 75–95 seconds, which expresses the time of fall in seconds of a 5/16 inch steel ball through 10 inches of a 15 percent solution by weight of cellulose acetate dissolved in a solvent composed of 90:10 methylenechloride ethanol by weight at 25° C. This method is defined in ASTM D–871–46–T.

Methylenechloride, when combined with an alcohol, such as methanol, ethanol, propanol, etc., forms a good solvent for cellulose triacetate which is the major constituent of the casting composition, referred to in the trade as "dope" which is used to form the base for certain motion picture film. Acetone is not a solvent for cellulose triacetate, but is a good solvent for cellulose diacetate which is still sometimes used as the base in forming motion picture film and both the acetone and the alcohol and methylene chloride mixture function as solvents for the films when a cellulose triacetate film is spliced to a cellulose diacetate film. When the base of both films is formed of cellulose triacetate, the acetone, being water-miscible, aids the dimethylformamide in removing condensed water from the splice.

While I have described my novel cement as being especially useful for splicing photographic film, its use is not limited thereto. The novel cement of my invention may be used for uniting organic plastic materials such as cellulose esters or the vinyl resins, such as styrene, for example, in any shape or form. It may be used for fixing toys, plastic household articles, etc.

My invention is not limited to the detailed description thereof as given above but includes all modifications that fall within the scope of the appended claims.

I claim:

1. A normally liquid composition of matter consisting essentially of methylene chloride, ethanol, acetone, dimethylformamide and a cellulose ester, the amount of dimethylformamide in the composition ranging from 0.3 to 6.0 milliliters per liquid ounce (29.6 milliliters).

2. A composition of matter as recited in claim 1 wherein the cellulose ester is present in an amount ranging from 0.14 gram to 4 grams per 100 milliliters of cement.

3. An adhesive cement for splicing photographic film consisting essentially of methylene chloride, ethanol, acetone, from 3 to 6 milliliters of dimethylformamide per 100 milliliters of cement and from 0.15 gram to 4 grams of cellulose nitrate per 100 milliliters of cement.

4. An adhesive cement as recited in claim 3 wherein the amount of dimethylformamide is 3.7 milliliters per 100 milliliters of cement and the amount of cellulose nitrate is .15 gram per 100 milliliters of cement.

5. An adhesive cement for splicing photographic film consisting essentially of methylene chloride, ethanol, acetone, cyclohexane, 3.5 milliliters of dimethylformamide per 100 milliliters of cement, and 0.14 gram of cellulose acetate per 100 milliliters of cement.

6. An adhesive cement for splicing photographic film having the following ingredients and proportions:

| | | |
|---|---|---|
| Acetone | milliliters | 60 |
| Cellulose nitrate | grams | 0.2 |
| Ethanol | milliliters | 10 |
| Dimethylformamide | do | 5 |
| Methylene chloride | do | 60 |

7. An adhesive cement for splicing photographic film having the following ingredients and proportions:

| | | |
|---|---|---|
| Methylene chloride | milliliters | 60 |
| Ethanol | do | 10 |
| Cellulose acetate | grams | 2.0 |
| Acetone | milliliters | 10 |
| Dimethylformamide | do | 5 |
| Cyclohexane | do | 2 |

8. An adhesive cement for splicing photographic film having the following ingredients and proportions:

| | | |
|---|---|---|
| Methylenechloride | Milliliters | 60 |
| Ethanol | do | 10 |
| Cellulose acetate | grams | 2.0 |
| Dimethylformamide | milliliters | 5 |
| Cyclohexane | do | 2 |

9. A normally liquid film splicing cement containing as the essential ingredients, a low boiling solvent medium selected from the group consisting of methylene chloride, mixtures of methylene chloride and acetone and mixtures of methylene chloride, acetone and a low boiling alcohol, from 0.3 to 6.0 milliliters per liquid ounce of cement of a dialkylformamide selected from the group consisting of dimethylformamide and diethylformamide and an amount of a cellulose ester selected from the group consisting of cellulose nitrate and cellulose acetate to bring the cement to the desired consistency.

10. A film splicing cement as recited in claim 9 wherein said dialkyl formamide is dimethylformamide.

11. A film splicing cement as recited in claim 9 wherein said cellulose ester is cellulose nitrate.

12. A film splicing cement as recited in claim 9 wherein said cellulose ester is cellulose acetate.

13. A film splicing normally liquid cement containing as the essential ingredients thereof a mixture of methylene chloride and a low boiling alcohol, from 0.3 to 6.0 milliliters per liquid ounce of cement of a dialkylformamide selected from the group consisting of dimethylformamide and diethylformamide and a sufficient amount of a cellulose ester selected from the group consisting of cellulose nitrate and cellulose acetate to bring the cement to the desired consistency.

References Cited in the file of this patent

UNITED STATES PATENTS

| | | |
|---|---|---|
| 2,607,704 | Fordyce et al. | Aug. 19, 1952 |
| 2,697,044 | Battey | Dec. 14, 1954 |
| 2,856,306 | Johnson et al. | Oct. 14, 1958 |

FOREIGN PATENTS

| | | |
|---|---|---|
| 530,440 | France | Dec. 22, 1921 |